Sept. 27, 1927.                J. A. CAMPBELL                1,643,696
                                  ABSORBER
                      Original Filed July 30, 1925    2 Sheets-Sheet 1
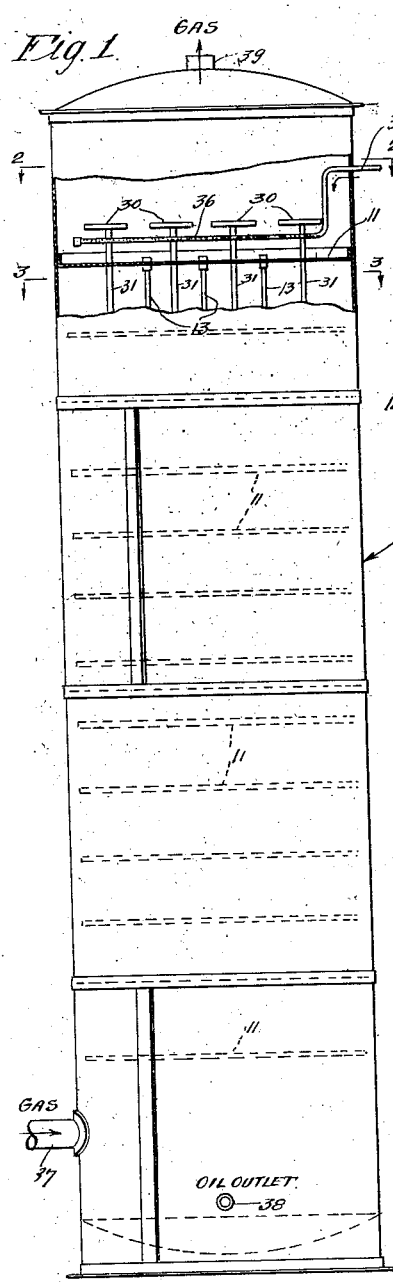
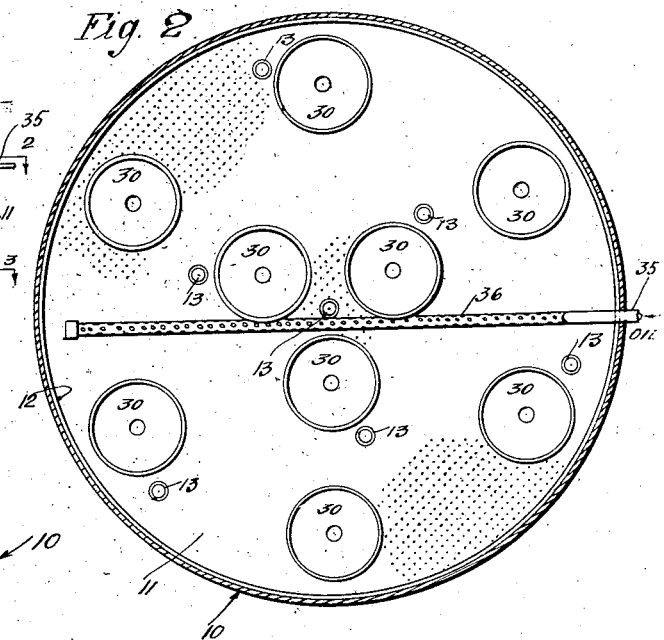
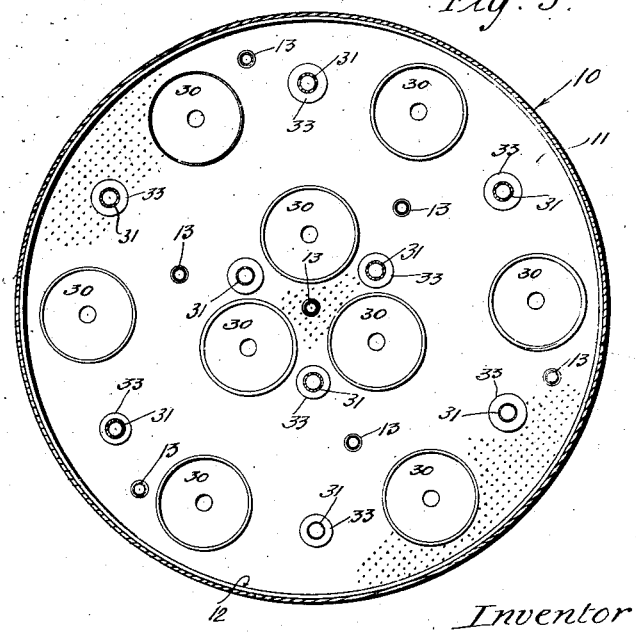
Inventor
Julian A. Campbell
Attorney.

Sept. 27, 1927.  
J. A. CAMPBELL  
ABSORBER  
Original Filed July 30, 1925   2 Sheets-Sheet 2
1,643,696
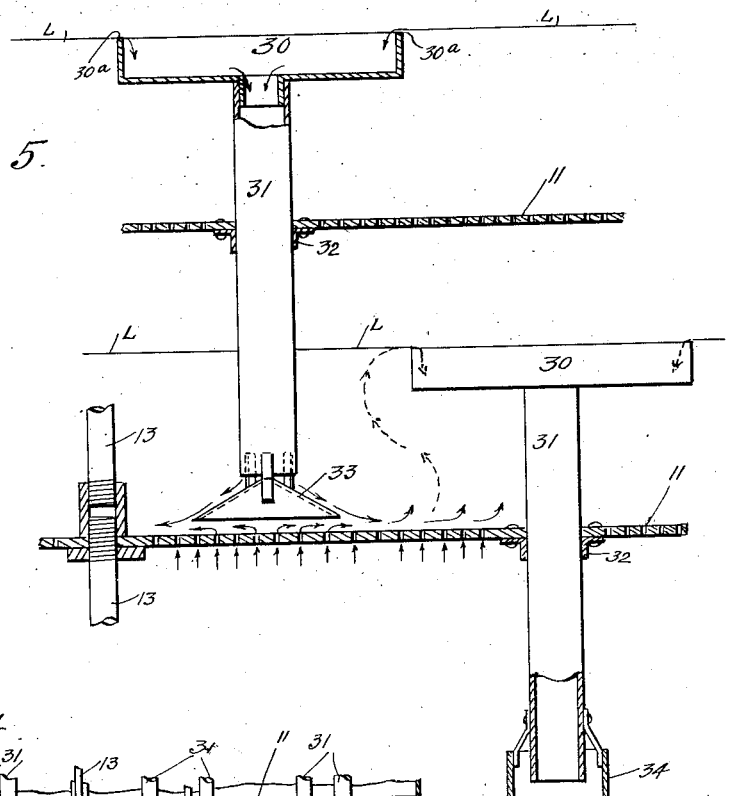
Fig. 5.
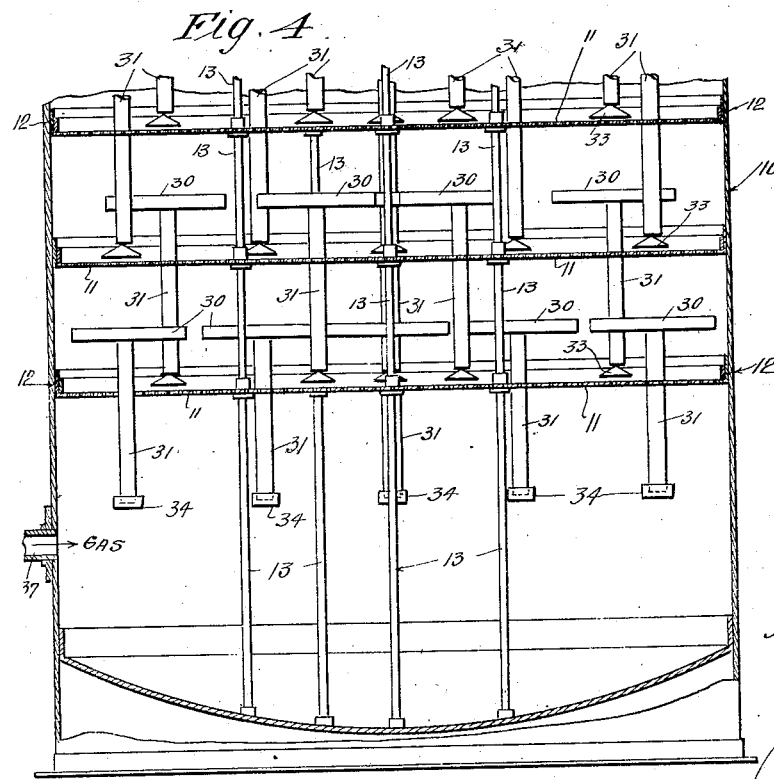
Fig. 4.
Inventor  
Julian A. Campbell
Attorney Patented Sept. 27, 1927.

1,643,696

UNITED STATES PATENT OFFICE.

JULIAN A. CAMPBELL, OF LONG BEACH, CALIFORNIA.

ABSORBER.

Original application filed July 30, 1925, Serial No. 46,974. Divided and this application filed January 4, 1926. Serial No. 79,073.

This application is a division of my application Serial Number 46,974, filed July 30, 1925, entitled "Absorber". In this application the subject matter of the invention relating to structure causing certain relative flow of gases and liquids is claimed; leaving in said prior application the claims upon the structural features having relation to support, assembly, etc. For that reason the features relating purely to structure will not be described in detail in this application.

This invention has to do with devices of the general character and type that are variously known as absorbers or bubble towers; their function being to intimately distribute and admix a gas or vapor with a liquid, so as to get intimate finely divided contact between the gas and liquid. Sometimes these devices are used for the purpose of loading a gas or vapor with substances that they may pick up from the liquid by reason of their intimate contact therewith. Thus although the present device is called an absorber and has been designed more particularly for use as such, and particularly for absorbing the vapors of volatile hydrocarbons such as gasoline from casing head gas and the like, it will be understood that the invention is not thereby limited to such use. A description of the apparatus and its operation specifically as an absorber will make it plain to all those skilled in the art how the device may be used for other purposes.

Although the general structure and details hereinafter particularly described are but illustrative and indicative of the invention, I give a detailed and specific description of the preferred and specific form of device shown in the accompanying drawings so that others may have a full understanding of at least one form of the invention, and from that may have a full understanding of the invention itself; it not being intended that the following described details of specific structure and operation shall be limitations upon the invention except as expressly so stated in the claims. For the purpose of such description, I now refer to the accompanying drawings, in which:

Fig. 1 is an exterior elevation, parts being broken away, showing a form of my improved absorber;

Fig. 2 is an enlarged horizontal section on line 2—2 of Fig. 1;

Fig. 3 is an enlarged horizontal section on line 3—3 of Fig. 1;

Fig. 4 is an enlarged vertical section of the lower part of the absorber showing the relative arrangements of its various elements; and Fig. 5 is an enlargement in detail of certain portions of Fig. 4.

The absorber is preferably housed within a tower-like shell or casing 10 constructed of any suitable material, preferably of sheet or plate metal. Within this tower there is a number of superimposed perforated floors 11. Each of these floors is formed of a suitable plate perforated with a large number of comparatively small openings, so that the gas flowing up through the floors is broken up into fine streams. And these openings are of such a size that gas pressure beneath the floor will prevent flow of liquid downwardly through the perforations.

The structure for supporting these floors and for making fluid-tight joints between them and shell 10 is the particular subject matter of said prior application and, therefore, will not be described here; except that I say that, as indicated at 12, means are provided at the periphery of each floor for making a fluid-tight joint with the shell, and that the floors are supported on suitable columns or posts 13 that extend vertically through the several floors. It will suffice here to say that the several floors are rigidly supported in vertically spaced relation, are supported so as to be accurately level and so that the overflow pans attached to each floor are accurately in level.

Each floor, as I have said, is formed of a perforated plate; and each floor carries a plurality of overflow pans 30 supported on tubes 31 that pass through the floor and extend to a point near the floor next below. Pans 30 are carried at a suitable height above their corresponding floors, the height depending somewhat upon various conditions, including the character or consistency of the absorbing liquid. It is the function of these pans to take overflow from the froth that forms over each floor, and their height may be somewhat varied in order to make them properly perform their functions. Tubes 31 may be supported in floors 11 by flange connections 32; and at their lower ends these tubes have spreader cones 33 that lie close to the floor below; the lower ends of the tubes being at points near enough the floor below that they are always submerged by the liquid or liquid and froth on that floor so as to prevent passage of gas directly up through the tubes. The tubes 31 of pans 30 associated with the lowermost floor 11, instead of having spreaders, have on their lower ends cups 34 forming liquid traps through which the gas cannot pass upwardly. By reference to Figs. 2 and 3 it will be seen that each floor carries a plurality of overflow pans 30 and that the arrangement on alternating floors is made so that the lower ends of tubes 31 from the floor above are spaced between the pans 30 on the next floor below. The pans 30 are made of considerable area, and are preferably relatively shallow.

The absorbing liquid—in a typical case, a fairly heavy petroleum oil—is fed into the apparatus through pipe 35 and is distributed to the uppermost floor 11 by a perforated pipe 36. Flowing over this uppermost floor the liquid is prevented from flowing directly through the floor perforations by reason of the gas pressure beneath the floor. The gas is initially introduced at 37 below the lowermost floor 11 and at a point above the liquid outlet 38, so that gas is introduced above the liquid level standing in the bottom of the shell. The gas, under suitable pressure, passes upwardly through the perforations in the lowermost floor and bubbling up in finely divided streams, and therefore in fine bubbles through the liquid on that floor, creates a considerable froth which stands on the surface of whatever clear liquid there may be present. This froth is constantly breaking up and releasing the gas into the space above, the gas being thus released to pass under pressure through the next floor up. At each floor the same kind of action takes place until the gas passes through the uppermost floor, when it finally passes off through the gas outlet 39.

At each floor a mass of froth is formed; fine bubbles being formed by formation of a film of oil around each minute gas bubble. This finely divided froth blows up in each floor until it reaches the level of the upper edges of pans 30; and the uppermost part of the froth then overflows constantly into the pans. It is the uppermost parts of the froth in which the individual bubbles are breaking and releasing gas; therefore the froth in this uppermost part, which flows over the edges of the pans and into the pans, breaks up, releases the entrained gas, and, in the form of clear liquid, flows from the pans through tubes 31 and thus down onto the next floor. As I have said before, the lower ends of tubes 31 are close enough to the next floor and submerged in the froth so that the gas cannot flow upwardly through the tubes. The gas is thus constantly being bubbled in very fine division through the liquid at each floor, a fine froth is constantly being formed, giving extremely intimate contact between the liquid and gas or vapor, the froth is constantly breaking up and the resultant liquid from the broken up froth is constantly flowing from one floor to the next. While the liquid is thus slowly flowing downwardly through the apparatus the gas is passing upwardly through it.

The capacity of the apparatus is governed mainly by its area in plan; the length of time during which the gas or vapor is in intimate contact with the liquid—and therefore the thoroughness with which absorption or other interchange between the gas and liquid takes place—is governed at least in part by the number of superimposed floors in the apparatus. However, it will be understood that in a structure of given size, the gas or vapor is in my apparatus put into much more intimate contact and kept in that contact during a much longer time period than is true in ordinary forms of absorption apparatus.

There are several features to which I wish particularly to call attention, these features having to do with the high efficiency obtained in my absorber. Considering Fig. 5, the froth level is there shown at L, this level being usually slightly above the peripheral edges of pans 30. I have found that a most effective breaking up of the froth and flow of comparatively clear liquid over the pan edges is obtained when the pan edges are left in what is known as the "raw" state. These pans are, in practice, made by cutting or shearing a strip of comparatively thin sheet metal (about #16 gauge), bending that strip to circular form and securing its ends together to form a side wall, and then securing the circular side wall to a bottom plate. In thus making the pans I leave the upper peripheral edge 30$^a$ in its raw cut state, not smoothing it in any manner, as for instance by rolling or by smoothing off the edge. This sharp raw edge I find to be very effective in breaking up the froth at the pan edge; so that practically nothing but clear liquid flows into each pan and thus flows down through tube 31 to the next level.

When this liquid reaches the next level it is spread out over the next floor 11 by the spreader cones 33. It will be noted that these spreader cones are so placed and formed that they throw the liquid outwardly and cause it to move outwardly over the floor 11; and immediately upon striking the floor this liquid begins to be picked up by the gas that flows through the perforations, being thus intimately intermingled with the gas and again formed into froth. Spreading cone 33 spreads the liquid flow out into a comparatively thin sheet or film; and this fact tends to increase the intimacy of contact between the gas and liquid. But it will be noted that the liquid flowing down through tubes 31 and spread by cones 33 is not thereby thrown upwardly, but is only thrown outwardly; that its flow motion is only outwardly over the floor under the mass of froth and that, in order to move upwardly, this liquid must be picked up by the upwardly flowing gas and therefore can only be moved upwardly as froth. Furthermore it will be noted that, because pans 30 cover a substantial proportion of each floor area, and because the spreader cones are spaced between the pans, the tendency of the spreader cones is to throw the liquid horizontally outwardly under the pans. This is clearly indicated by the arrows in Fig. 5. Consequently the liquid that is picked up and moved upwardly by the upwardly flowing gas cannot, even if moved upwardly as fairly large bodies of liquid rather than froth, immediately reach a position where it could flow over the edge of a pan. It must, as indicated by the dotted-line arrows in Fig. 5, follow a more or less tortuous upward path to reach the liquid surface surrounding the pans; and in following such tortuous path it is, of course, at all times coming into contact with gas that is moving up through the froth. The gas that comes up under the pans must also follow a long tortuous path to reach the froth surface, thus increasing its contact with the liquid. And the spreading of the gas under the spreader cones has also the same effect.

The sum total result of these arrangements is that a very high efficiency of action is obtained in my absorber, that action being due to the necessarily intimate contact between the gas and liquid and also due in some measure to the fact that, when the liquid flows from one level to the next, it is necessarily freed of gas.

At the lower ends of the lowermost tubes 31 it is not necessary to employ spreader cones, but the liquid seal cups 34 are there used merely to prevent gas from passing upwardly through the lowermost tubes 31. And it may be noted in this connection that cones 33, which are made of hollow sheet metal, as is indicated in Fig. 5, protect the lower ends of tubes 31 and prevent gas from flowing directly upwardly from the perforated floor through the tubes. The gas that flows through the floor perforations directly below a cone 33 cannot flow directly up through the tubes, but is turned horizontally under the cone, flowing out under its lower edge, and this outward radial flow of gas under and around each cone helps in flowing the clear liquid radially outwardly over the floor around each cone, this aiding in a wide-spread of the liquid flow, thus decreasing the thickness of liquid film and increasing the intimacy of contact between the upwardly flowing gas and the liquid. This outward radial flow of gas increases the length of its path to reach the froth surface; causes meeting and turbulence between the radial gas and liquid flows from adjacent cones; and increases both the time period and the intimacy of contact between gas and liquid.

I claim:

1. In a device of the character described, an exterior shell; a perforated floor within the shell, means to deliver gas under the floor, means to deliver liquid over the floor, said liquid delivering means including a plurality of spaced liquid feeding tubes leading downwardly to a level somewhat above the floor, a deflective liquid spreader at the lower end of each tube directing the liquid flow outwardly and horizontally over the floor around each spreader, so that the liquid flows over the floor in a comparatively thin and widely spread sheet and the gas passing upwardly through the floor perforations forms froth of the liquid; and means to remove liquid from above the floor comprising a plurality of spaced pans arranged at a level above the floor and above the lower ends of the tubes, said pans being of an aggregate area equal to a substantial fraction of the area of the floor and having sharp peripheral edges over which the liquid from the froth overflows.

2. In a device of the character described, an exterior shell, a perforated floor within the shell, means to deliver gas under the floor, means to deliver liquid over the floor, said liquid delivering means including a plurality of spaced liquid feeding tubes leading downwardly to a level somewhat above the floor, a deflective liquid spreader at the lower end of each tube directing the liquid flow outwardly and horizontally over the floor around each spreader, so that the liquid flows over the floor in a comparatively thin and widely spread sheet and the gas passing upwardly through the floor perforations forms froth of the liquid; and means to remove liquid from above the floor comprising a plurality of spaced pans arranged at a level above the floor and above the lower ends of the tubes, said pans being located over the floor areas over which the liquid is spread by said spreaders, so that the liquid flow around said spreaders extends to points under the pans.

3. In a device of the character described, an exterior shell, a plurality of superimposed spaced and perforated floors in the shell, means to deliver liquid above the uppermost floor, means to deliver gas under the lowermost floor, froth overflow pans above each floor with communicating tubes from their bottoms extending through their corresponding floors to a point near the floor next below, liquid spreading cones arranged at the lower ends of the several tubes just above the floor below, said cones acting to direct and spread the liquid flow outwardly and horizontally over said floor in a thin outwardly flowing sheet, and said pans above each floor being so located with reference to said spreaders above the floor that the spread liquid flow extends under said pans.

4. In a device of the character described, an exterior shell, a plurality of superimposed spaced and perforated floors in the shell, means to deliver liquid above the uppermost floor, means to deliver gas under the lowermost floor, froth overflow pans above each floor with communicating tubes from their bottoms extending through their corresponding floors to a point near the floor next below, liquid spreading cones arranged at the lower end of each tube just above the floor below, said cones acting to direct and spread the liquid flow outwardly and horizontally over said floor in a thin outwardly flowing sheet, said pans above each floor being so located with reference to said spreaders above the floor that the spread liquid flow extends under said pans, and said pans having sharp overflow edges for the purpose of breaking up the froth at their edges and inducing overflow into them of liquid.

5. In a device of the character described, an exterior shell, a floor therein perforated over substantially its whole area with relatively fine and closely spaced perforations, means to introduce liquid over said floor and gas below said floor under pressure so that the gas will flow up through the perforations into the liquid and form a froth above the floor, and means for removing liquid from the froth comprising a tube extending downwardly from a point above the floor and a wide shallow pan mounted on and communicating with the upper end of the tube, the bottom of the pan being substantially flat and spaced above the floor and overhanging the tube, so that the substantially flat pan bottom stands over certain of said perforations in the floor.

6. In a device of the character described, an exterior shell, a plurality of superimposed spaced floors in the shell, each floor being perforated over substantially its whole area with relatively fine and closely spaced perforations, means to introduce liquid over the uppermost floor, means to deliver gas under pressure under the lowermost floor so that the gas will flow up through the perforations in each floor into liquid above each floor and form a froth above each floor, and means for removing liquid from the froth above each floor and delivering the liquid to a point above the floor next below, said means comprising vertical tubes extending downwardly from points above each floor to points closely above the next floor below, and wide shallow pans one for each tube mounted on and communicating with the upper end of the respective tube, the bottoms of the pans being substantially flat and spaced above the floor and overhanging their respective tube, so that the substantially flat pan bottoms stand over perforations in the respective floors below them.

In witness that I claim the foregoing I have hereunto subscribed my name this 21 day of December, 1925.

JULIAN A. CAMPBELL.